Figure 5A:
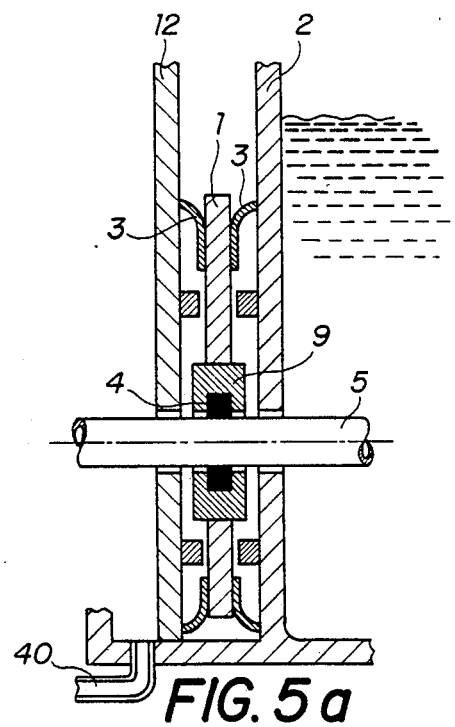

United States Patent [19]

Babel et al.

[11] Patent Number: 4,918,279

[45] Date of Patent: Apr. 17, 1990

[54] EDM CUTTING MACHINE INCLUDING DEVICE FOR PREVENTING TRANSMISSION OF SEALING PLATE MOVEMENT TO GUIDE HEAD ARM

[75] Inventors: Bernard Babel, Petit-Lancy/Geneve, Switzerland; Joseph Josserand, Cruseilles, France; Hans Lehmann, Vessy, Switzerland; Jean A. Ruffin, Bonne, France

[73] Assignee: Charmilles Technologies, S.A., Switzerland

[21] Appl. No.: 237,311

[22] Filed: Aug. 26, 1988

[30] Foreign Application Priority Data

Aug. 28, 1987 [CH] Switzerland ............... 03307/87

[51] Int. Cl.⁴ .................... B23H 1/00; B23H 7/10
[52] U.S. Cl. ......................................... 219/69.12
[58] Field of Search ............ 219/69 W, 69 D, 69.12, 219/69.14; 204/206, 224 M; 277/30; 285/24, 27

[56] References Cited

U.S. PATENT DOCUMENTS 4,565,915 1/1986 Girardin ................. 219/69 W
4,647,747 3/1987 Goto ....................... 219/69 W
4,808,786 2/1989 Shinkai et al. ........... 219/69 W Primary Examiner—Philip H. Leung
Assistant Examiner—Geoffrey S. Evans
Attorney, Agent, or Firm—Gifford, Groh, Sprinkle, Patmore and Anderson

[57] ABSTRACT

Machine for cutting by electrical discharge machining includes an electrode wire tensioned between and running betwee two guide heads each of which is mounted on an arm, one at least of the arms passing through a hole in one of the walls of a tank. The tank can move with respect to the arm and contains a machining liquid. A sealing plate 1 masks the hole in the tank and is linked by at least one seal 4 to the arm 5 through the wall. The wall 2 of the tank through which the arm passes slides along this plate. To prevent the forces due to friction and pressure arising between the plate 1 and the wall 2 and between the seal 4 and the arm 5 and acting asymmetrically on the arm through the wall being transmitted to the arm 5 and causing its deflection, a sheath 6 is mounted between the seal 4 and the arm 5 and encloses this arm without coming into contact with it.

14 Claims, 5 Drawing Sheets

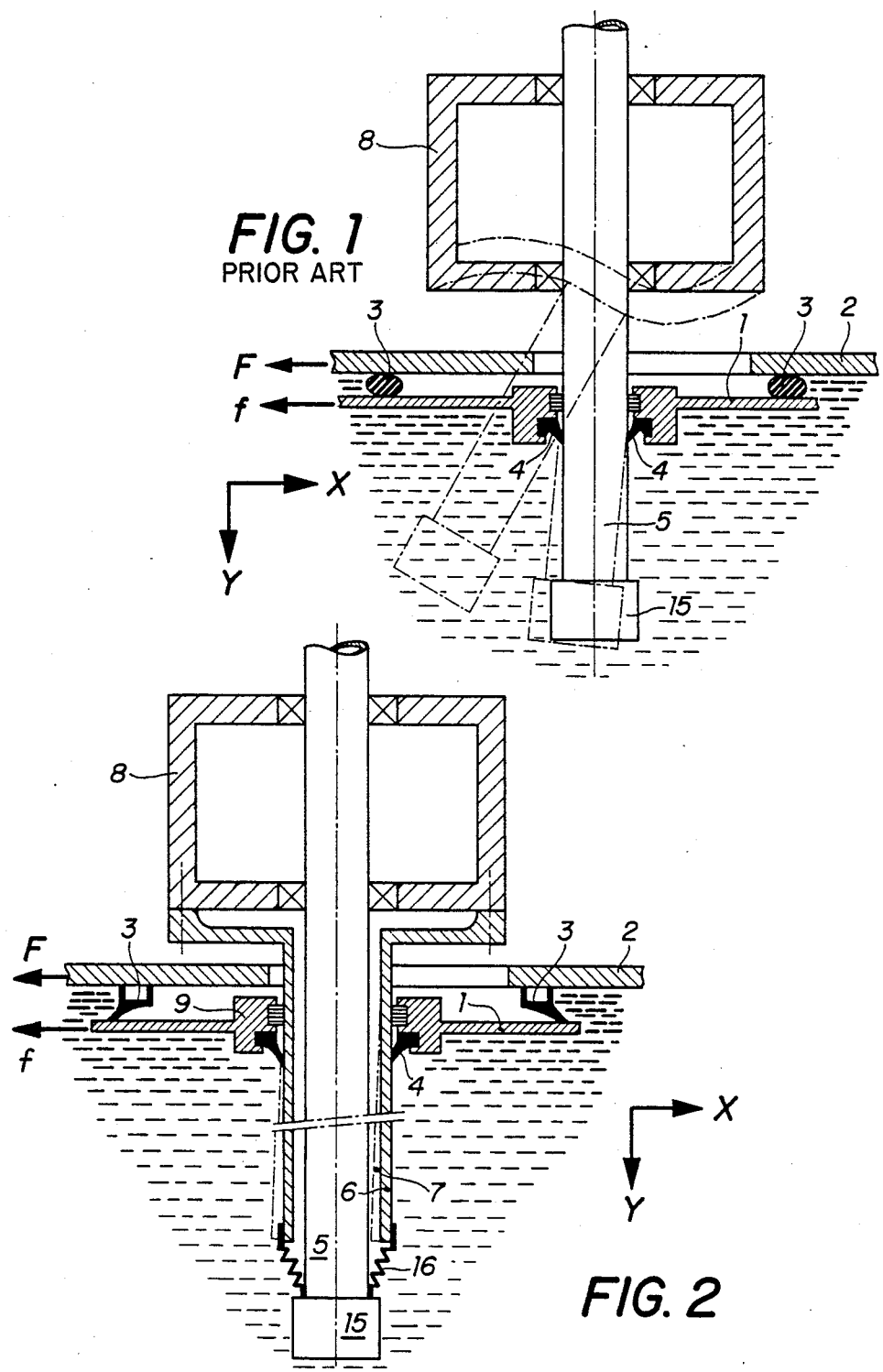

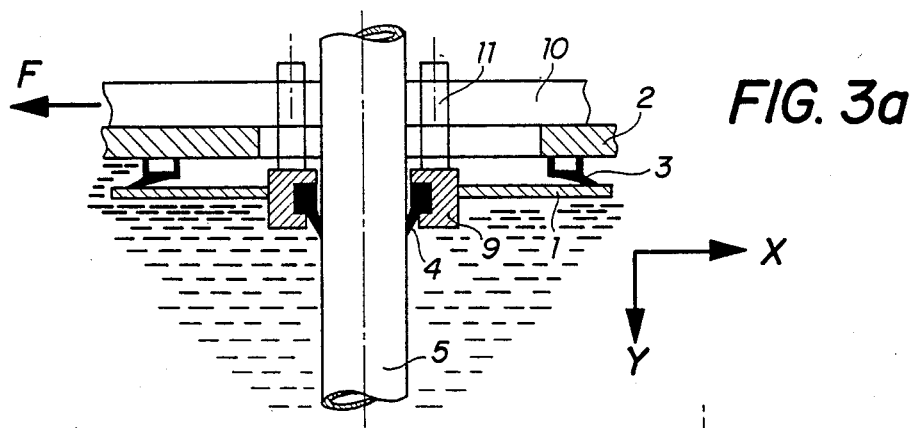
FIG. 3a
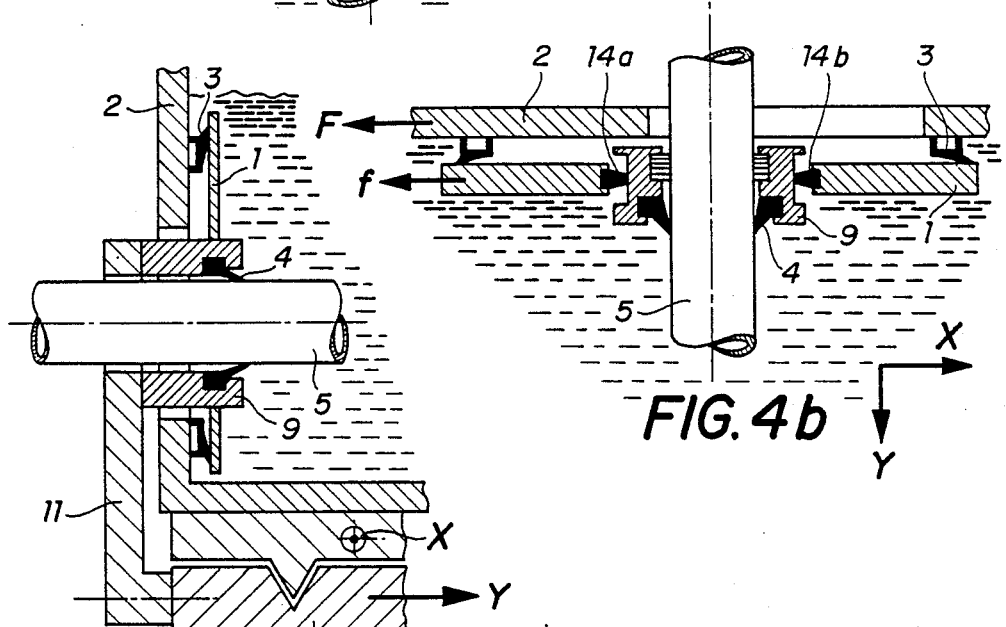
FIG. 3b
FIG. 4b
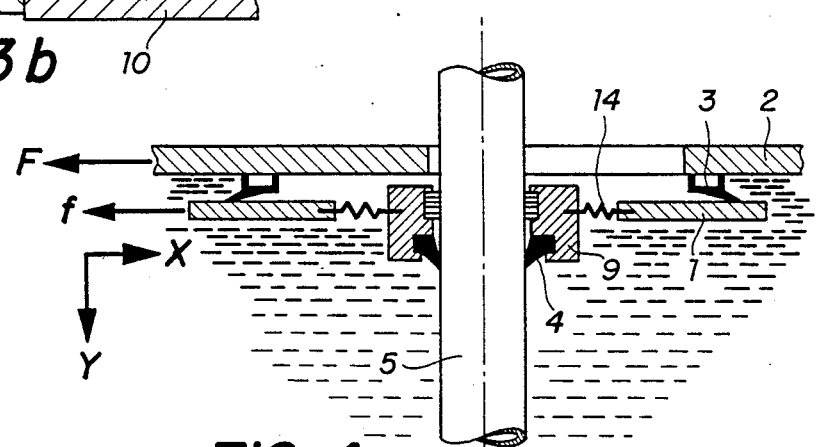
FIG. 4a

EDM CUTTING MACHINE INCLUDING DEVICE FOR PREVENTING TRANSMISSION OF SEALING PLATE MOVEMENT TO GUIDE HEAD ARM

This invention relates to a machine for cutting an electrode workpiece using electrical discharge erosion by means of a wire electrode running between two guide heads, each mounted on an arm. At least one of these arms goes through one of the walls of a tight tank containing a machining liquid, this being made possible by at least one opening in this wall. Said arm will hereinafter be called "passing-arm". A sealing device prevents the liquid from running out while allowing the tank and the passing arm to move relative to each other in two orthogonal directions. The workpiece-electrode is generally immersed in the machining liquid and is fixedly mounted to the tank. The tank is able to move by means of a table with crossslide motions. In general, the tank is rectangular and moves in two orthogonal directions parallel to its base, one direction being parallel to the axis of the passing arm (Y direction) and the other to the wall with the opening through which this arm passes (X direction).

Such sealing devices capable of withstanding the pressure of the liquid against the walls of the tank without deformation detrimental to their operation are known in the prior art, in particular the device described in the European patent EP 133 160. It consists of a plate with a hole in it through which passes the arm, along which moves the wall of the tank in which is made the opening through which the arm passes, said opening having a section such that it allows transverse movement of the tank with respect to this passing arm. The area of this plate is sufficient to allow it to mask the opening of this wall, irrespective of the position of the wall. At least one seal is located between the plate and the wall and at least one other seal is provided between the plate and the arm. The assembly formed by the plate and the seal between plate and arm is able to slide along the arm.

However, the pressure of the machining liquid on this plate gives rise to forces at the seals that prevent free movement of the wall. The pressure on the plate causes it to be pushed against the wall of the tank and to compress the seal provided between the plate and the tank wall. This gives rise to frictional forces between the wall and the plate when one slides along the other.

In the case of the machine described in this invention, where it is the tank that moves, the passing arm remaining fixed, it is the tank wall that slides parallel to the plate, which remains fixed, but the opposite case may also be envisaged. As shown schematically in FIG. 1, which represents a horizontal section of a device of the type of that described in the patent EP 133 160, the wall 2 of the tank moves in the direction indicated by the arrow F. Because of the above mentioned frictional forces, it tends to cause movement of the plate 1 (particularly since the seal 3 provided between wall and plate is squeezed between them by the pressure of the machining liquid), thus giving rise to an unwanted movement of this plate (in the direction of the arrow f). This plate therefore pushes the annular seal 4 provided between plate and arm hard against the passing arm 5, possibly compressing it, and thus exerting a pressure perpendicular to the surface of this arm. This causes, in particular, deflection or bending of this arm and consequently unwanted movement of its end carrying the guide head (or machining head) 15 in the same direction as that of the sliding of the moving wall, the axis of the arm being deviated from its original orientation with respect to the wall (this orientation being preferably perpendicular to this wall). This leads to a loss of accuracy which may be considerable. Moreover, this deformation of the arm also causes deformation of the face of the column 8 in which the passing arm is fixed to the frame of the machine, which accentuates the amplitude of the deflection of the arm.

Because of the fact that motion is simultaneous in the X and Y directions, this deflection has a further disadvantage. In fact, at the same time as movement takes place in the X direction, the seal 4 slides along the arm 5 (in the Y direction) and the frictional forces between seal and arm, which tend to oppose motion in the Y direction, are applied along only one side of the passing arm and therefore asymmetrically since the seal 4 is off-centre with respect to the axis of the passing arm. Since the movement of the seal 4 (and of the plate 1) is braked on one side only of the arm 5, the plate 1 and the arm 5 tend to be no longer perpendicular, which is an additional cause of deformation and loss of accuracy.

Finally, this unwanted motion of the plate 1 in the direction f, by asymmetrically compressing the seal 4 against the arm, may even cause this seal to lose contact with the surface of the arm with consequent loss of sealing.

It is evidently possible to improve the device described in the patent EP 133 160 in such a way as to reduce the frictional forces between the wall and the plate and between the arm and the seal around it. The various possible techniques (special seals and coatings, lubrication, etc.) are described below. However, the pressure exerted by the machining liquid and the magnitude of the frictional forces resulting from this are such that the improvements in accuracy thus obtained are still small and it has not been possible to reduce the effects due to frictional forces to the point of appreciably removing the horizontal deflection of the lower arm (passing arm).

The aim of the invention described here is to overcome these disadvantages. The object of this invention is a deflecting, or protective, device preventing these asymmetrical forces due to pressure and friction from acting asymmetrically on the passing arm, (it may also be termed an "anti-bending device"), arranged so as to prevent any deformation of the passing arm, in particular any unwanted horizontal movement of the guide head which would be due to these asymmetrical forces.

This device may be arranged, in particular, so as to prevent any relative movement between the plate and the passing arm in a direction perpendicular to the axis of the passing arm, for example by fixedly mounting the plate on a component of the machine which is fixed in the X direction (which prevents it from being moved transversally to the arm by the movement of the wall), or else
  by preventing an asymmetrical pressure from the plate from acting on the seal provided between plate and arm, or again
  by preventing any unwanted movement of the plate in the X direction from being transmitted to a guide system holding and/or guiding the seal provided between plate and arm.

This invention therefore concerns a machine for cutting by electrical discharge machining using a wire electrode, operating at least partially with the workpiece immersed or flushed at high pressure, with at least one arm passing through a wall of the tight tank containing the machining liquid and having a sealing plate masking the opening through which the arm passes, connected by at least one seal to this passing arm and along which plate the wall through which the arm passes can slide, characterized by a device to deflect the forces due to friction and pressure acting asymmetrically on the passing arm and due to the frictional forces arising between the plate and the wall through which the arm passes and at the seal provided between the arm and the plate, arranged so as to prevent transmission to the passing arm of any movement of the plate in the X direction perpendicular to this arm.

A first variant (see FIG. 2) is formed by a sheath fixed to the frame of the machine, surrounding the passing arm without coming into contact with it and interposed between said arm and the seal provided between the plate and the arm (which thus becomes a seal provided between the plate and the sheath). It is then the sheath, and no longer the passing arm, that will be subjected on one side only to the frictional forces and to a pressure exerted perpendicularly by the plate and transmitted by the seal provided between plate and sheath.

The clearance between the sheath and the arm must be sufficient to ensure that there is always a space everywhere between them, even in the case of maximum deflection of the sheath. This clearance may vary, for example, between 1 mm and 15 mm. The section of the sheath is not necessarily of the same shape as that of the arm. Thus a sheath having a square section may enclose an arm having a round section. However, the arm and the sheath are preferably two concentric circular cylinders.

A second variant (see FIG. 3) is formed by a system for fixing the plate to the slide of the table with cross-slide motions corresponding to the movements parallel to the axis of the passing arm (Y movement). Thus, the forces due to the pressure exerted by the machining liquid on the plate and tending to move it along with the moving wall are transmitted via this system to the slide and not to the plate-to-arm seal and to the passing arm (or the sheath when the two variants, for example, are combined). Since the reaction forces occur at the slide, they do not result in any deformation of the passing arm (or of the sheath).

A third variant is formed by a device in which the plate is no longer rigidly joined to the guide system holding and guiding the annular seal(s) around the passing arm but is resiliently connected to this guide system. The unwanted movements of the plate in the X direction are no longer transmitted to this system nor therefore to the seal(s) around the arm (see FIG. 4).

The device mounted on the EDM machine of this invention may be constituted differently from the three variants mentioned above by way of example. These variants, which have proved themselves particularly effective, may be used in combination and/or in conjunction with other improvements tending to reduce the frictional forces at the seals of the sealing device, these improvements being described below.

The three variants are best described by means of the appended drawings, in which FIG. 1, already dealt with above, gives a schematic representation of the process of deflection of the passing arm, due in particular to the friction given rise to between the sealing plate and the sliding wall of the tank by the pressure of the machining liquid against this plate and the walls of the tank; it is a section in an horizontal plane perpendicular to the wall through which the arm passes and containing the axis of this arm.

FIG. 2 illustrates a first variant of a device according to this invention, formed by a sheath that mechanically isolates the arm through the wall from the sealing device; it is also a section in a horizontal plane, perpendicular to the wall through which the arm passes and containing the axis of this arm.

FIG. 3 gives a schematic representation of a second variant of a device according to this invention, formed by a system for fixing the sealing plate to a fixed component of the EDM machine; this is a section in a horizontal plane perpendicular to the wall through which the arm passes and containing the axis of this arm, (FIG. 3a) and of a section in a vertical plane, perpendicular to the wall through which the arm passes and containing the axis of this arm (FIG. 3b), FIGS. 4a and 4b show a third variant of a device according to this invention formed by a resilient connection system between the sealing plate and the assembly that is liable to slide along the passing arm; it is a section in a horizontal plane perpendicular to the wall through which the arm passes and containing the axis of this arm.

FIGS. 5a, 5b, 5c, 5d, 5e, 5f, 5g, 5h, 5i, 5j, 5k and 5l, summarize sections in a vertical plane perpendicular to the wall through which the arm passes and containing the axis of the arm. These sections illustrate various possible ways of constructing the sealing device.

According to the first mode of realization of this invention, shown in FIG. 2, the plate 1 is extended by a part 9, that may be provided with grooves of various sections in which are inserted one or more arm-to-plate seals 4 and which guides said seal 4 when it slides along the sheath 6 mounted coaxially around the arm passing 5. The plate 1 is pressed hard against the seals 3 by the pressure of the machining liquid, thus ensuring satisfactory sealing. (When the workpiece is not immersed during machining, the plate 1 may be pressed against the seals 3 by any appropriate known system). Consequently, the wall 2, when it moves in the X direction, causes movement of the plate, leading to asymmetrical forces due to pressure, said forces being exerted on one side only against the wall of the sheath 6 by the annular seal 4 held in the guide part 9 and causing deflection of the sheath. The space 7 arranged between the sheath 6 and the arm 5 is sufficient for this deflection not to be transmitted to the arm 5. The sheath 6 is fixed to the machine frame, as far as possible from the place where the arm 5 is embedded. The arm is embedded in the face of the column 8 located opposite the wall of the tank through which the arm 5 passes and the sheath is shaped so that it can be fixed to the sides of the column adjacent to this face. This method of fixing the sheath prevents the forces due to the bending of the sheath and which are transmitted to the column by the embedding of of said sheath in the frame from deforming this column near the place where the passing arm 5 is itself embedded. This prevents deformation of the frame causing deflection of the passing arm 5.

This sheath 6 may be extended as far as the machining head 15 carried by the arm 5 or may end some distance beyond the opening through which the arm passes.

A flexible seal may be arranged between the sheath 6 and the arm 5, possibly sealing the space 7 between the arm and the sheath but not transmitting the deformation of the sheath 6 to the arm 5. In particular, it may be a bellows 16 as shown in FIG. 2 and arranged near the machining head 15. It may also be of another type and located for example near the point where the arm 5 is fixed to the column 8. This sheath 6 may have a multiple wall and be, for example, a double-walled cylinder. In the same way as the space 7, the space between the two walls may be sealed or not.

The space 7, which is generally a few millimetres, or the space that may be arranged between the double walls, if any, of the sheath, may be used with advantage when it is sealed and therefore dry, to bring certain wiring to the machining head 15 or for mounting the device required for the return of the electrode wire. It is particularly advantageous to use one of these spaces for stabilizing the temperature of the arm 5 at the temperature of the machining liquid, for example, by means of ducts allowing the circulation of an appropriate fluid, for example water or the machining liquid maintained at a constant temperature, which may be that of the liquid held in the tank, for example 20° C.

Such temperature stabilization of the passing arm is mainly useful when working with partial immersion or flushing.

It is also possible to immerse a sheath-arm assembly which does not have a seal to close the space 7. This space can then fill up with the machining liquid. It is then possible to provide a part, such as a flexible permeable membrane, to filter this machining liquid to prevent the space 7 from becoming clogged up.

Instead of being fixed to the sides of the column 8, the sheath may go through it, as is the case for the arm. It may also, in a machine of different design, be fixed, for example, to a beam or a fixed table, etc.

According to a second mode of realization of the invention which is particularly advantageous, shown schematically in FIG. 3, the plate 1 is fixed by means of a device 11 to the slide 10 of the table with cross-slide motions. In the example illustrated in FIG. 3, this fixing arrangement is located at the guide part 9. The slide 10, which allows movement in the Y direction, remains fixed during a movement in the X direction. The plate 1 is therefore no longer moved in the X direction by the sliding motion of the wall 2. Therefore, it does not push against and possibly compress the annular seal 4, thereby eliminating any asymmetrical pressure on the arm 5 perpendicular to its axis and therefore any risk of bending of this arm. Moreover, the annular seal 4 around the arm 5 no longer being subjected to an asymmetrical pressure no longer risks being crushed on one side; this improves sealing and facilitates its sliding along the arm 5 when the tank moves in the Y direction. Other advantages of this variant with respect to the two other variants and with respect to the device described in the patent EP 133 160 are due to the improvement in the transmission to the seal 4 of the movement in the Y direction controlled by the movement of the slide 10. According to this variant, the movement of the slide 10 is transmitted virtually directly, by means of the device 11, to the guide part 9 extending the plate 1 around the annular seal 4. In the other variants, on the other hand, the movement of the slide 10 is transmitted first to the tank, in particular to the wall 2 and then via the plate-to-tank-wall seal 3 to the plate 1 and the part 9 surrounding seal 4.

According to a third variant shown schematically in FIG. 4, the sealing device described in the European patent published under the number 133 160 is modified so that the part 9 enclosing the annular seal 4 is no longer rigidly joined to the plate 1 but is connected to the plate by a link 14 which forms a seal and is sufficiently resilient not to transmit movement from one of the components 1 and 9 to the other, in particular any unwanted movement of the plate 1 to the guiding part 9 and therefore to the seal 4 around the arm 5 or the sheath 6. This seal 4 then exerts no asymmetrical pressure on the arm 5 and can slide freely along this arm in the Y direction while ensuring satisfactory sealing, even if the plate 1 moves in the direction indicated by f. This is effective particularly when the unwanted movement of the plate is relatively small as a result of either the pressure of the liquid not being too high or the frictional forces between plate and wall being relatively small.

On the other hand, since the movement in the Y direction can no longer be transmitted to the seal 4 by the plate 1, the movement of this plate in the Y direction can no longer control the sliding of the seal 4 along the arm 5. An appropriate system, not shown in FIG. 4a, connected to the part 9 then controls the sliding of this part. It may be a system of the type of the device 11 described in connection with the previous variant, that is to say connecting the part 9 to the slide 10 of the table with cross-slide motions (Figure 5k). A combination of these two variants can thus prove to be particularly advantageous.

However, an appropriate configuration of the part 9 may allow it to be moved in the Y direction by the plate 1 (FIG. 4b). The link between the part 9 and the plate 1 may, for example, be provided by an O-ring seal. It will be compressed asymmetrically (in 14b, not 14a) but will not transmit the movement in the f direction of the plate 1 to the part 9.

It is also possible to provide a link 14, for example bellows or a cylindrical membrane, arranged so that only the plate 1 moves in the Y direction during movement of the tank in this direction, the assembly formed by the part 9 and the seal 4 remaining fixed with respect to the arm 5. The seal 4 then serves only for sealing. There are no longer any frictional forces in the Y direction. Evidently, this is mainly practicable for small travels in the Y direction (see in particular FIG. 5l).

Finally, this third variant has yet another advantage : since the plate 1 is no longer rigidly linked to the seal 4 and its guiding part 9, it is free to move slightly in the X direction as the sealing device slides in the Y direction along an arm 5 that might not be perfectly parallel to this Y direction. This variant thus allows compensation for imperfect alignment of the arm 5.

It is evidently understood that the above examples are not of a restrictive nature and are given only by way of illustration. Numerous modifications may be made, in particular regarding the composition of the sealing plate, the type of seals, the shape of the tank wall sliding along the plate, the type of resilient sealing system linking the plate and the guiding part of the annular seal sliding along the arm, used in the third variant, the use of the space between the sheath of the first variant and the arm, the system used in the second variant fixing the plate to the slide of the table with cross-slide motions responsible for movement in the Y direction as well as the type of EDM machine considered, without going outside the scope of this invention. The variants described above may be combined in pairs or all three may even be used together.

Moreover, as already mentioned above, any measure tending to reduce the friction between the plate and the wall and between the plate and the arm may be used in conjunction with a device according to this invention. Thus, the sealing plate may be rigid or formed by a flexible sheet, strip or band in stainless steel or other material resistant to corrosion and the pollution of the machining liquid, such as a sheet of aluminium or PVC. It may be made from or coated with a material allowing sliding with the minimum possible friction of the plate-to-wall seal, in the case where this seal is fixed to the moving wall. When the plate is in the form of a band and by means of two systems provided for this purpose, it may be rolled up on each side of the sealing device or slide along the walls of the tank perpendicular to the moving wall 2 so as to allow a very large movement in the X direction. This rolling up may be realized, for example, so as to impart a curvature to a thin plate to compensate the curvature caused by the pressure of the liquid.

FIG. 5 summarizes various sections possible for the moving wall of the tank, for the different systems, in particular slides allowing it to slide along the sealing plate, for the reinforcing parts and the ends of the plate that engage in the said slides, such as for the various possible types of seals. The sealing plate and its extension guiding the annular seal 4 around the passing arm or the sheath, the moving wall, the passing arm, the sheath and the plate-to-wall seal are always designated by the reference numbers 1, 9, 2, 5, 6 and 3 respectively.

Thus, the wall 2 of the tank sliding along the plate 1 may be backed up by a second parallel wall 12 (FIG. 5a) or at least by a panel 22 up to a height less than the full height of the tank (FIGS. 5b, 5c and 5d) and also provided with an opening for the arm 5, possibly surrounded by a sheath 6, to pass through. It may incorporate two slides 20 and 21 in which the sealing plate 1 engages (FIGS. 5b, 5e, 5f, 5i, 5k and 5l).

This wall 2 is generally made from a sheet of steel and therefore in a material that is relatively flexible and deformable. However, since it is important that it remains accurately parallel to the sealing plate 1 so as to be able to slide along this plate with the least possible friction, it may be advantageous to reinforce it (so that it does not bend under the pressure of the liquid in the tank) for example by a rigid frame 30 (FIGS. 5f and 5g) and/or even a double guide frame 31 and 32 sliding on each side of the sealing plate, thereby improving not only the geometry of the wall but also that of the sealing plate 1 (FIGS. 5g and 5h). In fact, this plate is generally made from flexible stainless steel strip, for example. A reinforcing part 33 may also be fixed to the outside of the tank (FIGS. 5f, 5h, 5i and 5j). This may define a slide guiding the movement of the moving wall 2 (FIG. 5i). It may also serve as a slide and guiding system for the sealing plate 1, which itself is located outside the tank (FIG. 5j). Because the moving wall 2 is easily deformed, it has been envisaged to make the holes required for fixing slides or reinforcing parts by means of EDM technique so as to avoid denting the plate by using conventional methods. In this way it is possible to make the holes in the plate without affecting its flatness. It is also possible to cast a tank in a rigid material, such as cast aluminum, such a tank having a constant geometry.

Moreover, if the assembly formed by the moving wall and the reinforcing parts fixed to it is arranged so as to provide just a slot in which the sealing plate is housed, the wall-to-plate seal becomes optional since slight leakage is acceptable if operation with controlled leaks is used (see, for example, FIGS. 5g and 5j). This can also be achieved with an appropriate shape of the slides 20 and 21 in which the edges of the sealing plate 1 are accommodated and an appropriate shape of these edges (FIG. 5i). Thus, the rounded edges of sealing plate 1 made of PVC or aluminium may slide and form a seal in a V-groove coated with "TEFLON" (a trademark of E.I. Du Pont de Nemours & Co. for TFE fluorocarbon polymers).

The seals used in the device described here may be of the most varied types and made of any of the well known state-of-the-art materials : circular seals or membranes in foam rubber, PVC, neoprene, polytetrafluoroethylene and other plastics (TEFLON LWBRIFLON, LINATE, nylon, TURCITE), waterproof fabrics, metal strip or band, in stainless steel or brass for example, or any other material ensuring good sealing, even when it is subjected to the pressure of the machining liquid, while allowing the moving wall to slide easily along the sealing plate or the circular seal or seals to slide along the arm, while withstanding immersion in the machining liquid. They may be bonded or fixed by mechanical means to the moving wall 2 or to the sealing plate 1. Evidently, they will be selected as appropriate to the surface on which they slide and taking into account both their functions: sliding with as little friction as possible and good sealing. Thus a scraping pad intended to slide along an arm or sheath in stainless steel will advantageously be coated with "TEFLON" on the contact area corresponding to this sliding motion, the part itself being made of any elastomer having suitable mechanical properties. For example, sliding with low friction if obtained with a "TEFLON" seal sliding on an arm or sheath that has been hard chrome plated. Similarly, the guide parts 9 of the annular seals 4 are generally of hard metal, ceramic or "TEFLON". It may be advantageous to use guide systems provided with a flexible annular seal, of the craper seal type, for example, to provide sealing in conjunction with an annular part with a low coefficient of friction to provide the guiding function, such as a ball bearing or a "TEFLON" ring (FIGS. 1, 2 and 4). Also, a single seal may combine these two types of surface (FIGS. 3a and 3b). The scaper seal is positioned so as to retain the deposit left by the machining liquid on the arm or the sheath, thus protecting the guide seal and ensuring that this seal slides easily. In particular, the seals made by the firms SIMRIT, NEOTECHNA, MAAG TECHNIC, PERROT, ANGST & PFISTER and ELASTOFLON may be mentioned. Sealing between the plate and the moving wall may be satisfactorily provided by appropriate shaping of the edges of the sealing plate, these edges engaging in a slide coated with "TEFLON", for example. In this case, it is no longer necessary to provide for a seal between the plate and the wall. In the case of the second variant, the seal between plate and wall is no longer required to transmit the movement of the tank in the Y direction to the plate and to the annular seal in order to cause this seal to slide along the arm since this movement is controlled directly by the corresponding slide of the table with cross-slide motions. This makes it possible to select a seal that deforms simply in the X direction without transmitting unwanted movement in this direction to the plate. It is also possible to further reduce the risk of the occurrence of forces tending to cause movement in the X direction at the guide system of the annular seal around the arm when this variant is combined with the third variant : the movements of the sealing plate 1 are completely independent of those of the assembly made up of the guide part 9 and the annular seal 4 (FIGS. 5k and 5l). In this case, the link between the sealing plate 1 and the guide part 9 for the annular seal 4 may be flexible and provide sealing, being formed, for example, by bellows or by a cylindrical membrane sufficiently flexible to allow the plate to move through its full travel in the Y direction and to have unwanted movement in the X direction without causing movement of the guide part 9. The sliding of this guide part along the arm 5 (or sheath 6) is in fact controlled by the system 11 fixed to the slide 10 (FIG. 5k). In another method of construction, preferably corresponding to relatively small travel in the Y direction, the assembly formed by the guide part 9 and the annular seal 4 may be fixed with respect to the arm 5 and simply provide sealing (FIGS. 5l). This construction evidently eliminates all friction in the Y direction.

The frictional forces arising at the plate-to-wall seals and at the seals surrounding the arm are evidently largely governed by the materials of which the seals are made but also by their configuration and the state of the surfaces on which they slide (or rub) as well as by the geometry of these surfaces.

Various measures have been mentioned above which improve the parallelism of the surfaces undergoing relative movement at these seals. It is possible to further improve the accuracy of these relative movements by reducing the area of rubbing of the plate-to-arms seals on the sealing plate. Thus, instead of fixing the seal on the plate as described in the patent EP 133 160 (FIGS. 5a, 5b, 5c, 5k and 5l), it is fixed to the moving wall (FIGS. 5d, 5e and 5f). Similarly, the use of a tank with a single wall, and therefore with a single seal between plate and wall instead of two as described in the same patent, reduces the area of rubbing by half. It is even possible to eliminate this seal, as already mentioned above (Figures 5g, 5i and 5j).

Moreover, the surfaces on which the seals rub (passing arm and moving wall or sealing plate) may be made more slippery, for example by means of an appropriate coating (chrome plating of the arm, "EMATAL" coating, moving wall enamelled), lubrication (silicone grease) or a scraping device arranged for example at one end of the annular seal in order to eliminate the deposits left by the machining liquid or to remove traces of sticking that would affect the sliding of this seal along the arm.

The possibility should also be mentioned of guiding the sliding of the annular seal by a tube or a ball bearing cage assembly (protected from contact with the machining liquid) or by means of nylon or Teflon rollers, for example (FIGS. 5d, 5i and 5k).

Figure 5B:
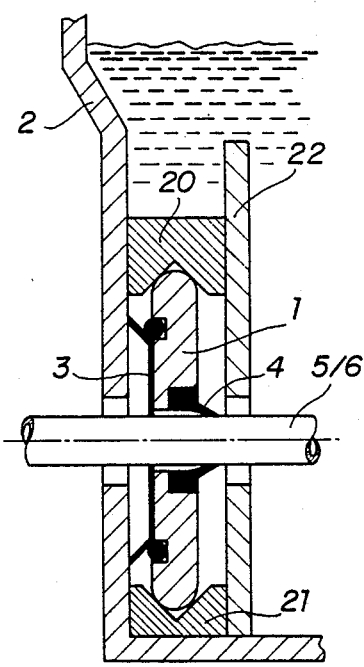
Figure 5C:
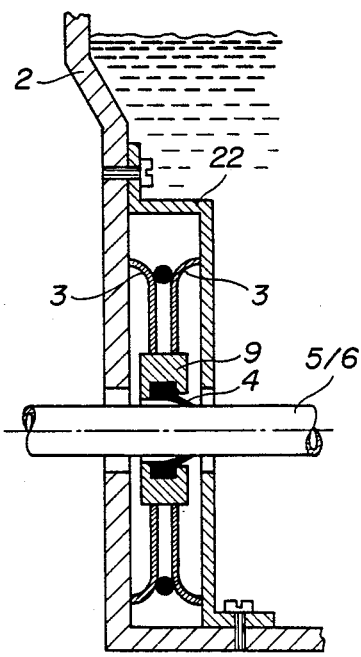
Figure 5D:
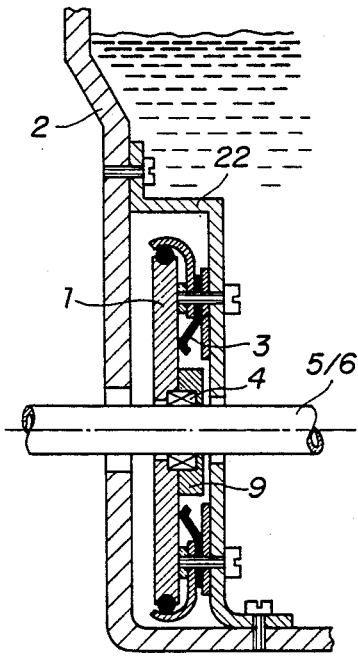
Figure 5E:
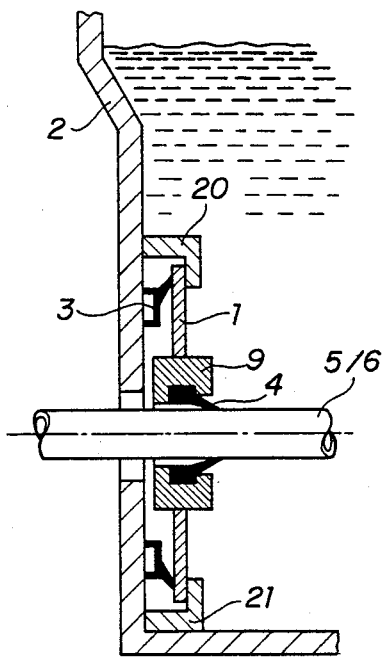
Figure 5F:
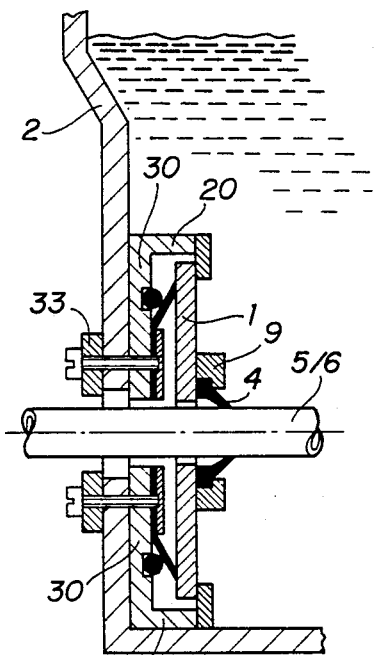
Figure 5G:
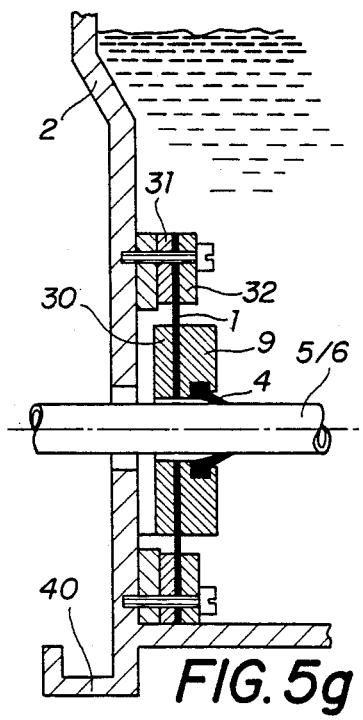
Figure 5H:
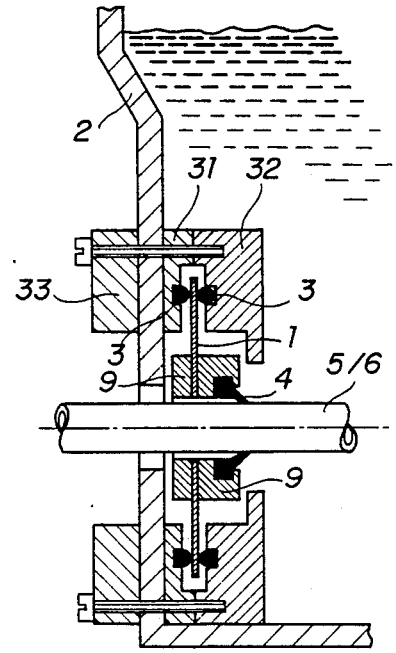
Figure 5I:
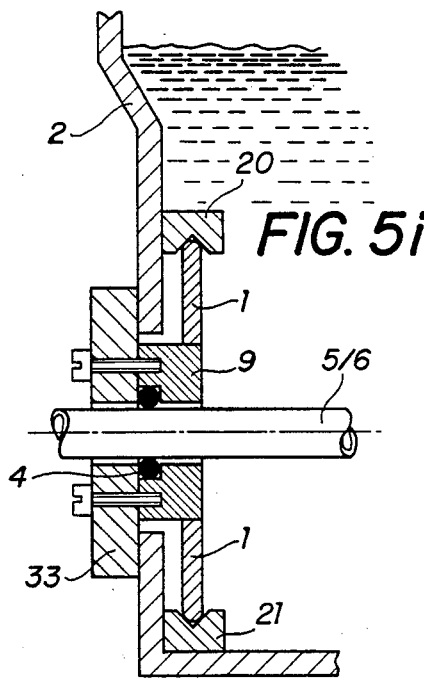
Figure 5J:
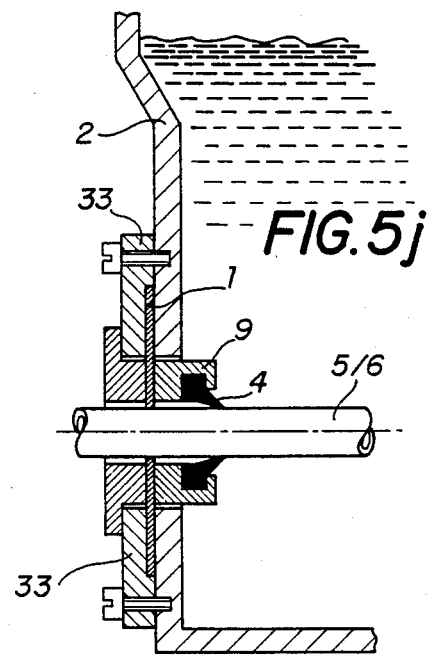
Figure 5K:
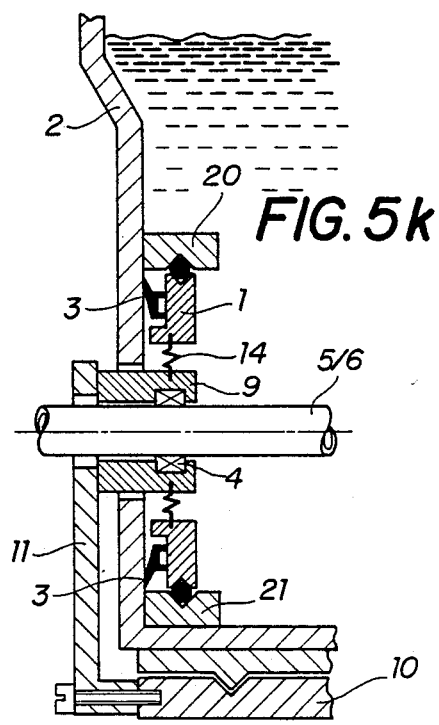
Figure 5L:
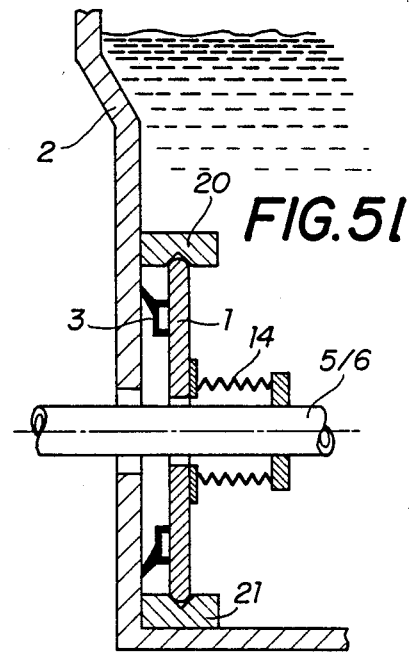

It is also possible to reduce the crushing of the seal (and therefore the frictional forces) by arranging slides in which are engaged the edges of the plate behind the moving wall, i.e. outside the tank (FIG. 5j) or by shaping them in an appropriate way (FIGS. 5k and 5l) or by locating the seal between the plate and the reinforcing panel (FIGS. 5b and 5d). Since in general a compromise must be reached between the frictional forces exerted by the moving seals used in the sealing device of this invention and their leak tightness, instead of attempting to obtain perfect sealing it may be preferable to tolerate a certain controlled leakage rate. The liquid lost by leakage is recovered and led away by a gutter (shown schematically with the reference number 40 in FIGS. 5a and 5g) arranged behind the moving wall of the tank and returned to the machining fluid reservoir.

The devices described above thus make it possible to obtain very good positioning accuracy of the lower guide head with respect to the X and Y axes, together with satisfactory sealing, and in the case of temperature stabilization of the passing arm made possible by the use of a sheath, still further improved reliability and accuracy.

We claim:

1. Machine for cutting by electrical discharge machining by means of an electrode wire tensioned between and running between two guide heads each of which is mounted on an arm, one at least of the arms passing through an opening in one of the walls of a tight tank containing a machining liquid, this tank and this passing arm being able to move with respect to each other, this machine having a sealing plate masking this opening in the tank and having a hole in it to allow the arm to pass through it, linked by at least one seal to the passing arm and along which can slide the moving wall through which the arm passes, characterized by a deflecting device arranged so as to prevent transmission to the passing arm of any movement of the sealing plate in a direction perpendicular to the axis of this arm, thereby preventing asymmetric action on this arm of frictional and pressure forces due to the frictions that take place between the sealing plate and the moving wall of the tight tank and between the seal connecting the sealing plate and this passing arm.

2. Machine according to claim 1 characterized by a deflecting device arranged so as to make the sealing plate rigidly joined to a component of the machine which is fixed in the X direction.

3. Machine according to claim 1 characterized by a deflecting device formed by a sheath placed between the passing arm and the seal connecting it to the sealing plate and enclosing said arm without coming into contact with said arm and fixed to the frame of the machine to the sides of the column adjacent to the face in which is embedded the passing arm.

4. Machine according to claim 1 characterized by a deflecting device having a linking component connecting the sealing plate to a guide part surrounding and/or guiding the seal or seals surrounding the passing arm and arranged so that the movements of this plate are independent of those of this guide part and of this or these seal(s).

5. Machine according to claim 1, characterized by the fact that at least one seal is arranged between the sealing plate and the sliding wall.

6. Machine according to claim 1, characterized by the fact that the sealing plate engages in two slides fixed to the sliding wall and is shaped, as are the slides, so as to ensure a relatively leakproof connection with this wall.

7. Machine according to claim 3, characterized by a sheath connected to the passing arm by a flexible leakproof link, arranged so that the space between said arm and said sheath is isolated from the machining liquid contained in the tank.

8. Machine according to claim 7, characterized by the fact that a fluid for stabilizing the temperature of the passing arm flows through this space.

9. Machine according to claim 3, characterized by a sheath with a double wall.

10. Machine according to claim 2, characterized by a system fixing the sealing plate to one of the slides of the table with cross-slide motions controlling the movement of the tank, this slide corresponding to movement parallel to the axis of the passing arm.

11. Machine according to claim 4, characterized by a leakproof linking component providing a resilient connection between the sealing plate and the guide part surrounding and/or guiding one or more seals 4 around the passing arm.

12. Machine according to claim 11, characterized by a guide part rigidly connected to the slide of the table with cross-slide motions controlling the movement of the tank parallel to the axis of the passing arm.

13. Machine according to claim 11, characterized by the fact that the seal or seals surrounding the passing arm and the guide part are fixed with respect to the passing arm.

14. Machine according to claim 12, characterized by the fact that the leakproof linking component 14 is arranged so that the sealing plate and the guide part move independently of each other.

* * * * *